(12) United States Patent
Haering et al.

(10) Patent No.: US 9,221,589 B2
(45) Date of Patent: Dec. 29, 2015

(54) REUSABLE BLISTER PACKAGING FOR BUTTON BATTERIES

(71) Applicant: Renata AG, Itingen (CH)

(72) Inventors: Pascal Haering, Aesch (CH); Eric Weber, Gelterkinden (CH)

(73) Assignee: Renata AG, Itingen (CH)

( * ) Notice: Subject to any disclaimer, the term of this patent is extended or adjusted under 35 U.S.C. 154(b) by 241 days.

(21) Appl. No.: 13/712,216

(22) Filed: Dec. 12, 2012

(65) Prior Publication Data

US 2013/0161230 A1 Jun. 27, 2013

(30) Foreign Application Priority Data

Dec. 22, 2011 (EP) ..................................... 11195332

(51) Int. Cl.
*B65D 85/88* (2006.01)
*B65D 75/36* (2006.01)
*B65D 75/32* (2006.01)
*B65D 75/58* (2006.01)

(52) U.S. Cl.
CPC .............. *B65D 75/36* (2013.01); *B65D 75/326* (2013.01); *B65D 75/5855* (2013.01); *B65D 2205/00* (2013.01); *B65D 2585/88* (2013.01); *Y02W 30/807* (2013.01)

(58) Field of Classification Search
CPC .... B65D 75/367; B65D 75/365; B65D 75/36; B65D 75/326; B65D 75/5855; B65D 2205/00
USPC ........................ 206/703–704, 461–471, 538
See application file for complete search history.

(56) References Cited

U.S. PATENT DOCUMENTS

| | | | | |
|---|---|---|---|---|
| 5,033,616 A | * | 7/1991 | Wyser | 206/704 |
| 5,046,618 A | * | 9/1991 | Wood | 206/532 |
| 5,788,079 A | * | 8/1998 | Bouthiette | 206/534 |
| 6,471,063 B2 | * | 10/2002 | Stepp | 206/530 |
| 2012/0080353 A1 | * | 4/2012 | Brenner | 206/704 |
| 2012/0205276 A1 | * | 8/2012 | Shackford | 206/469 |

FOREIGN PATENT DOCUMENTS

WO WO 2010/142587 A1 12/2010

OTHER PUBLICATIONS

U.S. Appl. No. 13/712,250, filed Dec. 12, 2012, Haering, et al.
European Search Report issued Apr. 30, 2012 in corresponding European Application No. 11 19 5332 filed on Dec. 22, 2011.

* cited by examiner

*Primary Examiner* — Chun Cheung
(74) *Attorney, Agent, or Firm* — Oblon, McClelland, Maier & Neustadt, L.L.P.

(57) ABSTRACT

Blister pack 1 for button battery comprising a blister foil 10 designed to provide at least an individual cup 12 for receiving a button battery, and an individual closure region 13 for each said individual cup 12. The closure region 13 receives a closure element 4 which is removably secured to the closure region 13.

6 Claims, 2 Drawing Sheets

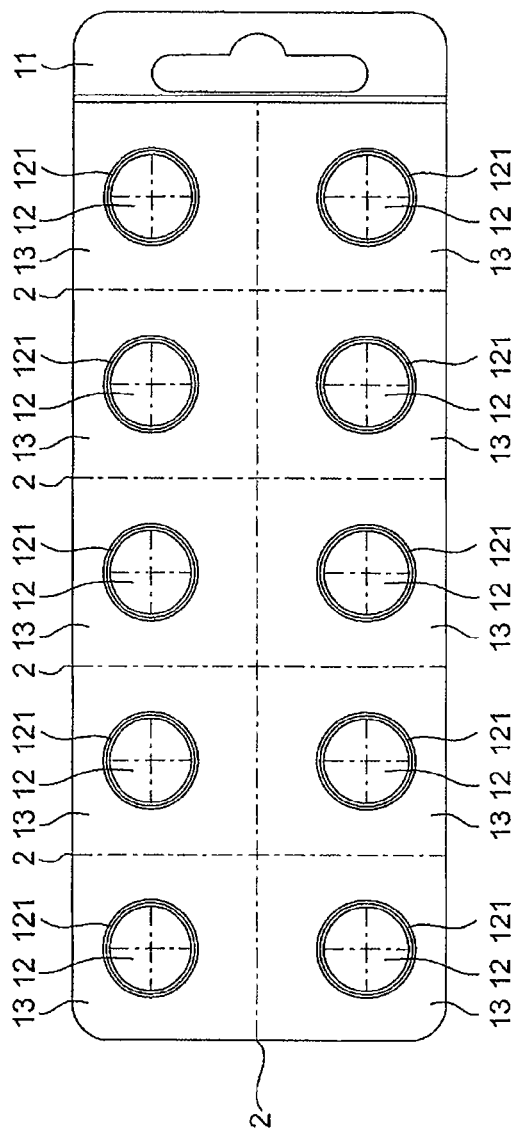
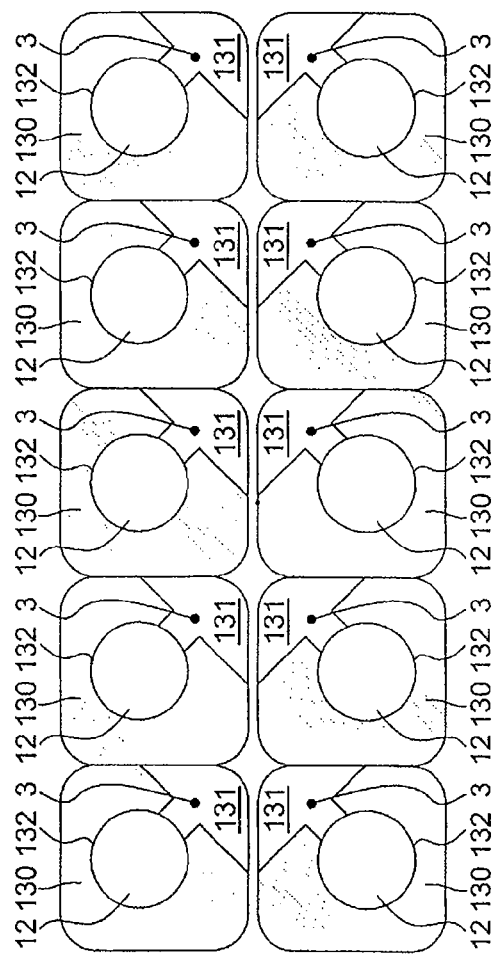

REUSABLE BLISTER PACKAGING FOR BUTTON BATTERIES

This application claims priority from European Patent Application No. 11195332.9 filed Dec. 22, 2011, the entire disclosure of which is incorporated herein by reference.

TECHNICAL DOMAIN

The present invention relates to a blister pack for button batteries, and especially for packs with individual compartments.

PRIOR ART

It is well known to market batteries in multiple arrangements in blister packs. Such packs are usually based on a cardboard piece with a one-sided coating and, placed on top, a transparent plastic film with thermoformed receiving spaces for spaced-apart button batteries. The front and rear side of the cardboard can be used for advertising, dating or providing information on the contents or on instructions for use. This type of packaging is also available for button batteries, wherein individual batteries are preferably released from the pack by pressing through a zonal section of the cardboard piece bounded by tearing lines, whereas unused batteries remain fixed on the cardboard until their removal.

A disadvantage of this solution is that the cardboard is relatively thick in order to keep the pack secure, so that the opening of the battery compartment requires relatively great force. Moreover, inadequately pre-imprinted tearing lines may result in adjacent areas of the cardboard piece to be torn out undesirably, so that the remaining batteries stored in the pack may drop out.

Another type of multiple blister packs is known for pharmaceutical pills, wherein a thermoformed plastic film defining individual cups for receiving the items is usually sealed by a thin metal film, and the cups are arranged according to an array pattern. Each of the closure regions surrounding a cup are separated from each other by rectilinear tearing lines, so that a subset of individual pills can be detached for nomadic use. The pills are extracted by pressing on the reverse side of the cups until the closure film is torn down and lets the items through for removal.

As opposed to usual battery blister packs, this type of blister packaging allows for an easier opening of the storage area and provides a more reliable modular removal scheme for each stored item, i.e. without dropping out any other battery of the pack; yet it is not suited for battery storage due to the risk of electrical shortcuts while contacting the sealing metal film. Moreover, for hygienic reasons the sealing is supposed to provide an hermetic closing, with only one-time opening capability. This ensures indeed that the storage area has remained unviolated prior to the actual extraction of the pill for its consumption, but also simultaneously prevents, on the other hand, from any subsequent use of the pack.

There is therefore a need for a blister package exempt from the known limitations of the prior art.

BRIEF SUMMARY OF THE INVENTION

It is a goal of the present invention to provide a blister pack suitable for button batteries, from which batteries can be easily pulled off, and can be reused for other purposes after the batteries have been first extracted from their storage area.

Another goal of the present invention is to provide a blister pack for batteries which still provides a sealing-proof mechanism for ensuring that the contained batteries have still not been used when first unpacked.

Still another goal of the present invention is to provide a blister pack for button batteries which can not only be freely portioned, but also hung for selling purposes.

These goals are achieved especially thanks to the features of independent claim 1, i.e. a blister pack 1 for button battery comprising a blister foil 10 designed to provide at least an individual cup 12 for receiving a button battery, and an individual closure region 13 for each said individual cup 12, wherein the closure region 13 receives a closure element 4 which is removably secured to the closure region 13. Advantageous embodiments are recited in the dependent claims.

An advantage of the blister pack according to the present invention is that is allows for a more efficient packaging for batteries with thinner and lighter closure elements.

Another advantage of the proposed blister pack is that it is suitable for disposing of the used button batteries, those latter being introduced into an already broken-open element during a battery change and subsequently disposed of together with the completely broken open back. This is beneficial from an ecological standpoint and in order to emphasize this aspect, according to a preferred embodiment the pack can be made of a biodegradable material in order to further improve simultaneously the recycling process of the batteries, in dispensing with packaging waste treatment.

BRIEF DESCRIPTION OF THE DRAWINGS

Examples of preferred embodiments of the invention are described in the detailed description hereafter in view of the following drawings in which:

FIGS. 3A and 3B show a multiple blister pack according to a preferred embodiment of the invention, arranged in a set of 2 columns and 5 rows, respectively according to a rear and front view.

DETAILED DESCRIPTION OF THE INVENTION

Figure 1:
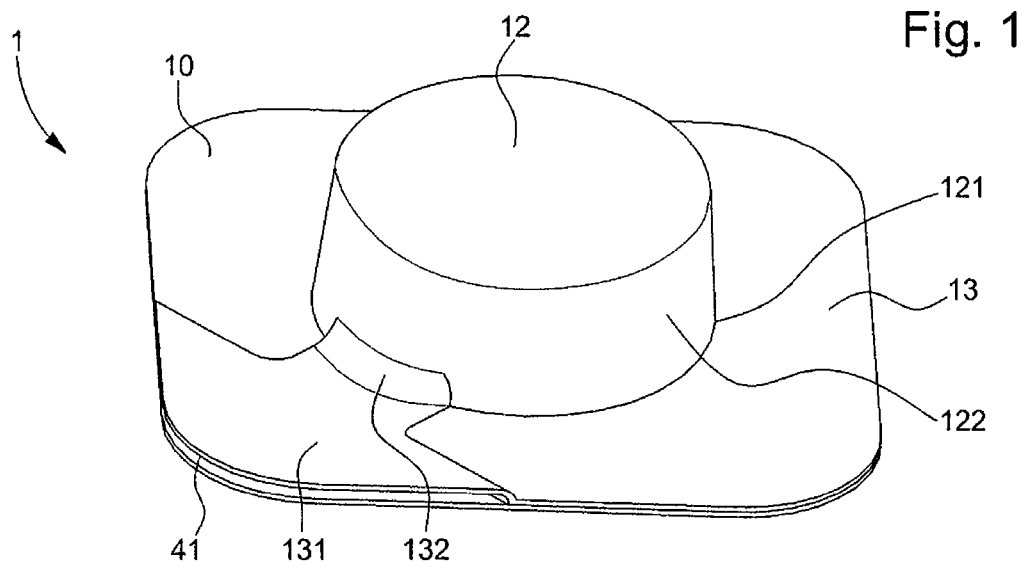
FIG. 1 shows a perspective view of a single blister pack according to a preferred embodiment of the invention.

FIG. 1 shows a perspective view of a single blister pack 1 for a button battery according to a preferred embodiment of the present invention, of a 24*24 mm size, in which a storage cup 12 is formed on a blister foil 10, e.g. a plastic film, by thermoforming, so that lateral walls 122 can be raised. The storage cup's edge 121 is surrounded by a closure region 13, whose corners are preferably rounded in order to prevent from any undesirable scratching or cutting when handling the pack. The closure region 13 is covered, on its entire area, by a closure element 4, in order to prevent the battery from dropping out when not yet opened. The closure element 4 comprises a gripping zone 41, here towards the corner of the closure element, in order to seize the closure element 4 more easily for opening it and then closing it again.

According to the preferred embodiment illustrated, the closure element 4 is a film, preferably a thin plastic film of less than 100 micrometer thickness, provided with a self-adhesive coating on its inner side. The closure region 13 comprises a sealing area 130 onto which the film is bonded. As it can be appreciated in view of FIG. 1, the closure region 13 comprises an aperture zone 131 on the lower left corner, where the blister foil 10 is slightly shifted upwards, typically between 100 and 200 micrometers with respect to the plane of the sealing area 130, in order to prevent a complete sealing of the closure element 4 on the entire closure region 13 and let air flow from the inside of the storage cup 12, where the battery lies, towards the outside. This air flow, allowing for both pressure and moisture compensation, is made possible thanks to the ventilation duct 132 extending up to the storage cup's edge 121. Such a ventilation duct 132 is preferably designed as a path with reduced width inside the aperture zone 131 in order to minimize its overall surface. As a complement or an alternative to this aperture zone 131 and the ventilation duct 132, the materials used for both the blister foil 10 and the closure element 4 can be chosen with adequate porosity features, such that extreme temperature and/or pressure variations can be supported, for example during the transport of the batteries inside their blister pack.

According to the illustrated preferred embodiment of the present invention, the gripping zone 41 arranged on the lower left corner is preferably deprived of any adhesive in order to avoid sticking to the fingers when manipulating the covering film making up the closure element 4. Such an adhesive-free gripping zone 41 also allows to easily position the covering film over the individual storage cup 12 with the correct angular orientation, i.e. the gripping zone 41 facing the aperture zone 131 when bonding it to the closure regions 13 again when replacing used batteries.

Figure 2A:
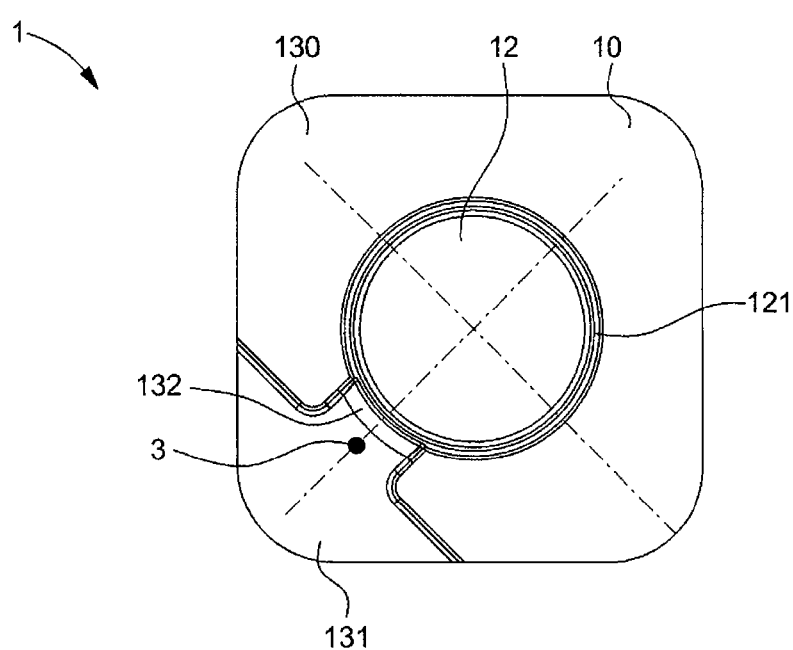
FIGS. 2A and 2B show the single blister pack according to the preferred embodiment of FIG. 1, respectively according to a rear and side view.
Figure 2B:
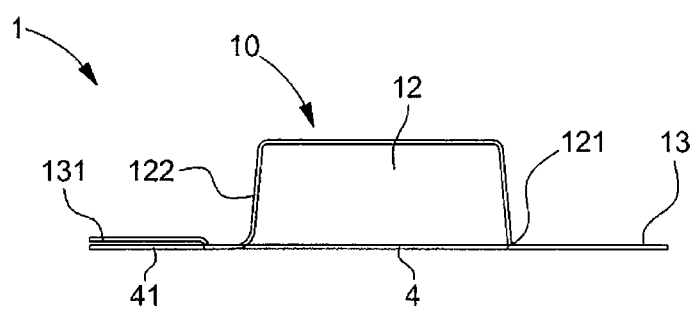

FIGS. 2A and 2B show different views of the same preferred embodiment as illustrated on FIG. 1, where the sealing area 130 of closure region 13 of the blister foil 10 is now dashed and the edges 121 of the storage cups 121 are represented in bold line due to the slight horizontal slope of the cup's lateral walls 122—visible on FIG. 2B—against the vertical direction. As it can be appreciated on FIG. 2A, a sealing proof 3 is arranged inside the ventilation duct 132 of the aperture zone 131 in order to ensure that an undamaged closure element 4 (not visible on this FIG. 2A) contains indeed an unused battery in each case. The sealing proof can for example consist of a welding spot between the blister foil 10, within the aperture zone 131 and the gripping zone 41 of the covering film. The sealing proof 3 could also be arranged as a glued spot within the ventilation duct or as one or several welded spots directly on the sealing zone 130, but in this case the sealing proof 3 should be placed in the vicinity of the aperture zone 131 of the closure region 13 in order to ensure that it reliably breaks open when somebody tries to pull the covering film out.

As shown on FIG. 2B, the diameter of the storage cup 12 is approximately equal to half of the overall size of the blister pack, and preferably equal to 13.1 millimeters. This makes up an overall sealing area 130 of 3.5 cm2, which is enough to provide a reliable bonding with the closure element 4, such as the disclosed self-adhesive coated film, while providing a good trade-off in terms of surface consumption for simultaneously maximizing storage capacity. The walls of the cup 122 further have a 5.4 millimeters height in order to comply with the standard size of button batteries.

According to an alternative embodiment for the present invention, the closure element 4 could consist of a folded part of the blister foil 10, folded over the storage cup 12 and the surrounding closure region 13, in which protruding portions and or recesses could engage into recesses and/or protruding portions of the closure region 13 to form spring clips and thus also ensure a non permanent securing of the closure element 4 with the closure region 13 of the blister foil 10 thanks to a click-type closing apparatus. An inconvenient of this solution would be, though, that the thickness of the system would be increased, as well as its weight, because the covering part would then be made of the same material and have the same a similar thickness as the blister film 10, whereas the cover film is usually much thinner in the preferred embodiment disclosed earlier. Moreover, folding lines would need to be designed and a plurality of spring clips would need to be formed in order to prevent any undesired bending of each foils, which would then leave enough space for dropping a battery out. All those necessary clips arrangements would result in substantially higher production costs. Moreover, opening and closing of the blister pack would not be as easy due to the minimal force constraints that need to be applied for opening the click spring clips. Yet an advantage of the solution would be that no separate covering elements, as well as no more auto-adhesive material would be required.

FIGS. 3A and 3B show a preferred embodiment of the present invention for a multiple blister pack 1, using the individual packs described hereinbefore in view of FIGS. 1, 2A, and 2B. FIG. 3A is a top view of the blister foil 10 in which storage cups 12 surrounded by their respective closure regions 13 are arranged into a matrix pattern, preferably a 5*2 matrix in order to store a round number of batteries (i.e. 10) per pack. Each closure region 13 is separated from a neighboring closure region 13 by a tearing line 2, so that any subset of the pack can be torn apart by a user when purchasing the batteries. As it can be appreciated in view of FIG. 3A, the blister foil 10 not only comprises storage cups 12 and closure regions 13, but also a hanging section at the rightmost part of the drawing, where a hanging hole 11 is provided for storing a plurality of packs on a display rack. The leftmost corners of the pack's cells, i.e. the storage 12 and their respective closing regions 13, as well as the rightmost corners of the hanging section are rounded in order to avoid any undesirable scratching or cutting when handling the pack.

As shown on FIG. 3B, aperture zones 131 with ventilation ducts 132 are provided on each closure elements 4, preferably made up by a self-adhesive coated film like the individual blister pack shown on FIGS. 1, 2A and 2B, and the same sealing-proof 3 is also provided. Likewise, gripping zones 41 are provided on the corners of each covering film. These corners may preferably be rounded, as illustrated on FIG. 3B, like for individual packs, in order not to have distinct cutting processes for individual packs and for multiple packs and thus achieve cost savings through economies of scale.

On FIG. 3B, the aperture zones 131, and the corresponding gripping zones 41 of the covering film are arranged near a main tearing line 2 in the middle of the multiple blister pack. In order to facilitate the opening of any individual pack without needing to detach it from the remaining packs still secured to the hanging section, or to accidentally damage neighboring cells, it could also be foreseen to arrange the aperture zones 131 towards the periphery of the pack, i.e. upper and lower part instead of the middle part. On the other hand, having those aperture zones 131 on the inside of the blister foil 10 makes them less exposed to any mishandling errors resulting in unwanted tearing open of especially the last (leftmost) cells of the pack.

For multiple blister packs it is desirable to have a matrix arrangement with at least two columns in order to improve the storage capacity of each pack. Yet since batteries are usually required in pairs, two can preferably be chosen as the most preferred number of columns since it is further easier to tear a row of two batteries along the same tearing line 2 than tearing a subset of two batteries within an array having a greater number of lines and columns.

The fact that the blister packs according the present invention may be reused for returning and/or disposing used button-batteries is more efficient from an ecological standpoint, since it can dispense with decentralized special garbage collecting points for used batteries, and also with additional dedicated packaging for returning faulty or used batteries. In order to further improve the recycling process of the batteries and their packaging, according to a preferred embodiment the blister foil 10 of the pack and the auto-adhesive coated film can be made of a biodegradable material such as corn starch in order to dispense with packaging waste treatment once the defective or used batteries have been collected.

| References list | |
|---|---|
| 1 | Blister pack |
| 10 | Blister foil |
| 11 | Hanging hole |
| 12 | Individual storage cup |
| 121 | Cup's edge |
| 122 | Cup's wall |
| 13 | Closure regions |
| 130 | Sealing area |
| 131 | Aperture zone |
| 132 | Ventilation duct |
| 2 | Tearing lines |
| 3 | Sealing proof |
| 4 | Closure element |
| 41 | Gripping zone |

What is claimed is:

1. A blister pack suitable for button batteries comprising:
a blister foil designed to provide at least an individual storage cup for receiving a button battery; and
an individual closure region for each said individual storage cup,
wherein said closure region receives a closure element,
wherein said closure element is removably secured to said closure region,
wherein said closure element comprises a gripping zone,
wherein said closure region comprises an aperture zone extending from the gripping zone up to the edge of said storage cup and prevents a complete sealing of said closure region,
wherein said gripping zone is arranged on a corner of a self-adhesive coated film, and wherein said corner is deprived of any adhesive material.

2. The blister pack according to claim 1, wherein said closure region is a sealing area.

3. The blister pack according to claim 2, further comprising a sealing proof.

4. The blister pack according to claim 1, wherein both said blister foil and said closure element are made of a biodegradable material.

5. The blister pack according to claim 4, wherein said blister foil comprises a plurality of individual storage cups and closure regions separated by tearing lines, wherein said individual storage cups are arranged on said blister foil according to a matrix pattern with at least two columns.

6. The blister pack according to claim 5, wherein said blister foil further comprises a hanging hole.

* * * * *